Jan. 6, 1942.  S. T. WILLIAMS  2,268,733
PNEUMATIC SAFETY CONTROL FOR PRESSES
Filed Nov. 30, 1938  2 Sheets-Sheet 1
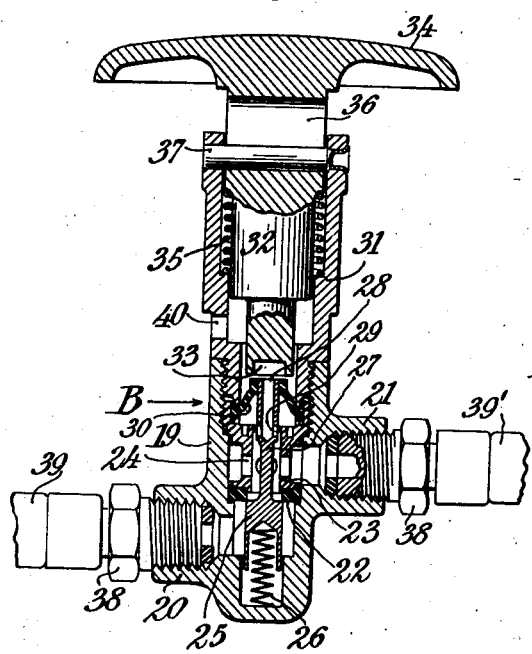
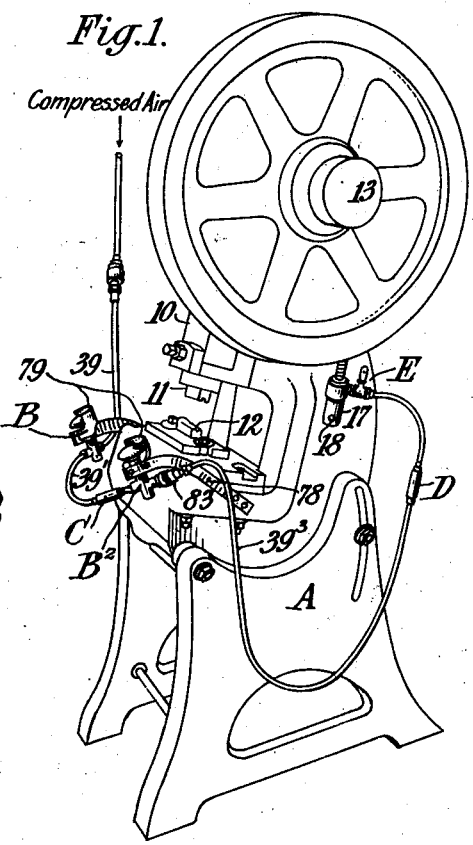
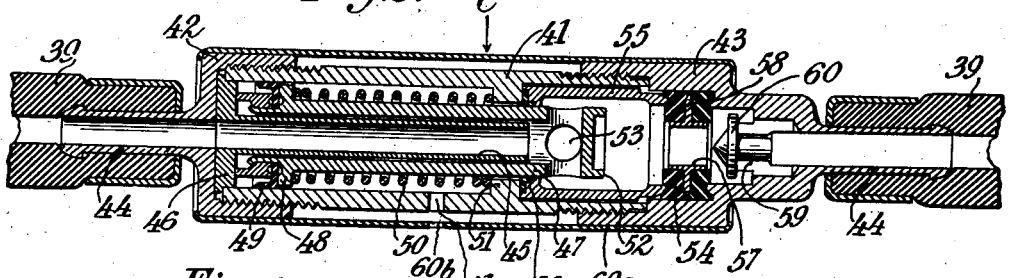
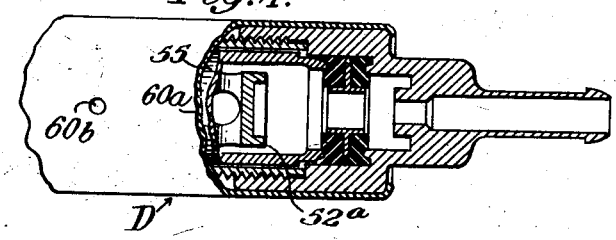
INVENTOR
Selden T. Williams,
BY
Fraser, Myers & Manley
ATTORNEYS.

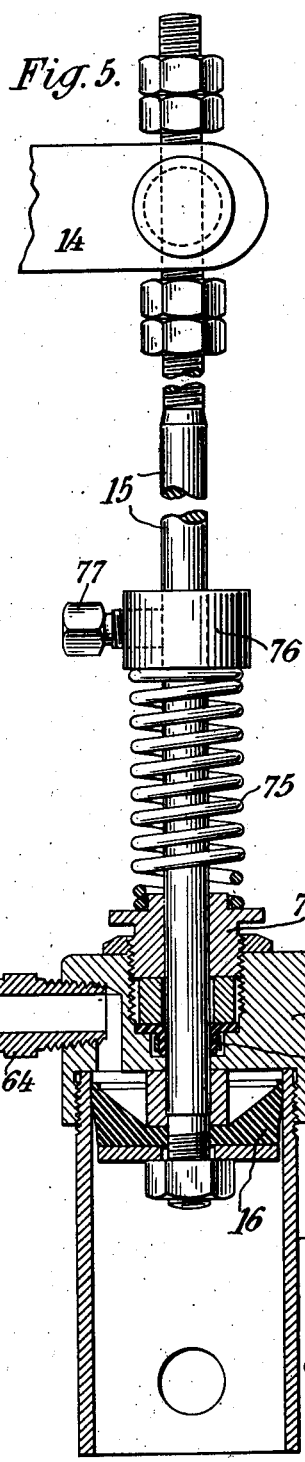

Patented Jan. 6, 1942

2,268,733

UNITED STATES PATENT OFFICE 2,268,733

PNEUMATIC SAFETY CONTROL FOR PRESSES

Selden T. Williams, Bellerose, N. Y., assignor to Scovill Manufacturing Company, Waterbury, Conn., a corporation of Connecticut Application November 30, 1938, Serial No. 243,220

4 Claims. (Cl. 121—38)

My present invention relates to safety control devices for power presses and the like, and more particularly to such safety devices which are pneumatically controlled.

The prevention of injury to press operators of power presses has long received the attention of safety engineers and labor boards and much has been done to reduce the hazards to personal injury incident to press operations. Various forms of safety appliances in the nature of safety clutches, electrical devices and mechanical shields have been devised, and while these have met with varying degrees of success and recognition, on the whole they have been open to one objection or another. Among the primary objections met with by these safety devices are: (1) their tendency to slow down the press operation; (2) their high installation cost; (3) their non-foolproof character; and (4) their safety characteristics could be circumvented by an operator who desired to speed up production.

My present invention provides a safety device for power presses and the like which overcomes the various objections and limitations abovementioned. In its underlying concept my invention relies upon compressed air to operate a plunger for tripping a clutch on the drive shaft of the press or for operating an equivalent means, and a plurality of control valves so disposed with relation to the operating head of the press that both hands of an operator must be used to operate said valves and be well away from danger when doing so; and further, said valves are shielded so that they can not be accidentally operated. My invention is capable of installation on machines that are equipped with either nonrepeat or repeating type clutches and in every case the safety device embodies at least two manually operable valves and one or more cut-out valves of novel design.

The principle, construction and operation of my improved pneumatic control safety device will be better understood from the deailed description which follows, when considered in connection with the accompanying drawings which show a practical embodiment of my invention, and wherein:

Figure 1 is a perspective view of a power press showing my invention applied thereto.

Fig. 2 is a longitudinal section through one of the manually operable valves forming a part of my invention.

Fig. 3 is an axial section through a cut-out valve forming a part of my invention.

Fig. 4 is a fractional view of a modified form of cut-out valve.

Fig. 5 is a longitudinal section of a further detail of my invention, certain parts thereof being shown in elevation.

Although my invention is capable of use with any type of press or machine which has a movable head adapted to move toward and away from a complemental member and between which members the hands of an operator must be positioned in the handling of the work to be operated upon by the machine, I have shown my safety device applied to a power press A of conventional design having a movable head 10 which carries a die 11 for cooperation with a complemental die 12 mounted on the base of the press. The head 10 is reciprocable so as to bring the dies 11 and 12 into operative position to the work being acted upon, and reciprocation of the head 10 is provided by rotation of the shaft 13 upon which is mounted a clutch (not shown) of any approved type. As herein shown, the clutch is adapted to be tripped by a clutch trip 14 carried by a rod 15, one end of which carries a piston 16 mounted in a cylinder 17 which is shown as pivotally mounted at 18 to the press frame.

For operating the clutch trip only when the hands of the operator are well away from danger, I have provided a pair of manually operable valves B and B² and a cut-out or automatic pressure operated valve C which form part of a pneumatic circuit adapted to establish fluid communication between the interior of the cylinder 17 with a source of compressed air. In Fig. 1 of the drawings I have shown included in the pneumatic circuit, a cut-out valve C, a second cut-out valve D, and a relief valve E. The structures and functions for the valves B, B², C, D and E, will be presently described.

The manually operable valves B and B² are identical in construction and each consists of a hollow casing 19 having lateral tubular offsets or projections 20 and 21 providing induct and educt openings, respectively, in the casing. Within the casing between the lateral offsets is a shoulder upon which is mounted a valve packing seat 22 which is held in place by a tubular plug 23 having lateral openings 24 therein, the said plug being screw-threadedly or otherwise held in position within the casing. Mounted within the casing for engagement with the packing seat 22 is a valve check member 25, the lower portion of which is hollowed out and encloses a helical spring 26 for normally holding the valve against its seat. The valve check 25 above the seating portion thereof is formed with an axial pin 27, the upper end 28 of which is of tubular form and of a diameter to snugly slide through the axial opening in the tubular plug 23, and said tubular portion of the pin, at its lower end, is formed with lateral openings 29. To insure against leakage and to provide an air seal between the top of the tubular plug 23 and the top of the hollow portion 28 of the valve pin 27, I connect said parts together by a cone-shaped packing 30. Any suitable means may be employed for holding this packing in contact with said parts, and as herein shown, the packing which is formed as a separate part has a sliding fit with the hollow portion of the valve check pin and is held in clamping engagement with the tubular plug 23 by a tubular member 31 which screw-threadedly engages within the casing 19. Mounted for telescopic movement within the tubular member 31 is a plunger 32, the inner end of which is recessed as at 33 to engage over and seal the open end of the hollow portion of the valve check pin when the plunger is depressed in the act of unseating the valve check 25. The plunger 32 is of a length to extend beyond the top of the tubular member 31 and is normally urged outwardly by a helical spring 35 mounted between a shoulder within the tubular member 31 and a shoulder on the plunger 32. For limiting the extent of the plunger movement and for holding it against separation from the tubular member 31, the plunger is formed with a slot 36 through which extends a pin 37 carried by the tubular member. For facilitating movement of the plunger by the hand of an operator, the plunger at its outer end is provided with an enlarged mushroom head 34. The tubular lateral offsets 20 and 21 are each threaded for connection with screw-threaded nipples 38 to which are attached sections of hose or flexible conduits 39, 39', 39², and 39³ forming a part of the pneumatic circuit. The tubular member 31 is also formed with a lateral opening or vent 40 which, it will be observed, provides open communication through the tubular portion 28 of the valve check pin and the lateral openings 24 in the tubular plug 23, with the bore through the lateral offset 21, the educt opening of the valve B, when the check valve 25 is seated. When the valve check 25 is unseated it will be appreciated that this open communication is cut off by the seal provided by the engagement of the lower end of the plunger 32 with the coned packing 30.

The automatic pressure operated cut-out valve C consists of a casing formed of a central substantially cylindrical tubular element 41, the ends of which are screw-threadedly connected to tubular end members 42 and 43, each of which terminates in an outwardly-directed nipple 44 to which an end of the conduit or hose 39 is suitably connected. Mounted within the casing provided by the elements 41, 42, and 43, is a tubular member 45 having a bore substantially flush with the bore through the nipple end of the element 42 and having an outwardly directed flange 46 which is clamped against a flat surface in the element 42 by the screw-threaded connection between said elements 41 and 42. Surrounding the tubular element 43 in slightly spaced relation thereto is a tubular plunger check valve 47 which at its end adjacent the flange 46 is formed with a flange 48 and carries a piston packing 49 having a diameter to air-tightly move within the cylindrical bore of the element 41.

Surrounding the plunger check valve 47 and bearing at one end against the flange 48 is a helical spring 50, the opposite end of which bears against an inwardly-directed flange 51 on the tubular element 41 for the purpose of exerting a force upon the plunger valve for normally holding it in its unseated position as shown in Fig. 3. The plunger valve 47 at its other end is closed and formed with an annular ring 52 rearwardly of which the plunger valve is formed with lateral openings 53 leading from the interior of the tubular plunger to the duct through the cut-out valve. The closed end of the plunger valve is adapted to engage a valve seat packing 54 mounted within the tubular element 43 and held therein by a sleeve 55 which is clamped between the annular flange 51 and said packing in the assembly of the elements 41 and 43, there being also provided a packing 56 between the sleeve 55 and the flange 51, which packing engages the outer wall of the plunger valve 47 to provide an air-tight seal therewith. The packing 54 consists of two washers which are pressed over a tubular sleeve 57 having an outwardly-directed flange or rib 58 intermediate its ends. The element 43 between the nipple 44 thereon and the packing 54 therein is formed with a chamber having a spider 59 for guiding the stem of a floating valve 60, the face thereof which engages the packing 54 being of conical form and of smaller effective area than the opposite face of said valve. The function for this construction will presently be explained. To prevent tampering with the cut-out valve parts, they are housed within a shell 60a having a vent opening 60b. The tubular element 41 also has a vent opening 41a for permitting the venting of any air under pressure which may find its way into said element.

The cut-out valve D shown in Fig. 4 is similar in all respects to the valve C above described except that the cut-out valve D does not have a valve therein corresponding to the floating valve 60.

The relief valve E may be of any approved form and its primary function is to provide an adjustable vent for the venting of air from the cylinder 17. As shown, it consists of a plug 61, screw-threadedly mounted in a T-fitting 62 which in turn is connected at one end through a nipple 63 to a section of hose 39, and at its other end through a screw-threaded nipple 64 to a head 65 mounted on the cylinder 17. The plug 61 has a bore therethrough, and intermediate the ends thereof it has a valve seat 66 upon which is adapted to seat a valve member 67 having a passage 68 therein through which air may vent when the valve is unseated. For adjusting the valve plug 67 it is screw-threadedly mounted into the plug 61 and formed at its outer end with a kerf 69 adapted to accommodate a screwdriver. A lock-nut 70 serves to lock the valve in adjusted position. Enclosing the outer end of the plug 61 is a dust cap 71 having a vent opening 72 therein.

Mounted in the cylinder head 65 is a gland packing 73 for insuring against air leakage from the cylinder around the plunger rod. The gland packing is held in place by a plug 74 which also serves as a bearing for one end of a compression spring 75 mounted on the rod 15, the other end of the spring bearing against an adjustable collar 76 which is adapted to be held in fixed position by a set screw 77.

The manually operable valves B and B² may be conveniently attached to the machine by means of brackets 18 which are bolted to the ends of the bed of the press. These brackets may also conveniently carry shields 19 which extend above and partially encircle the mushroom heads 34 of the valves B.

The device hereinbefore described is capable of operation for tripping a clutch of either the non-repeat or the repeating type. When used with a non-repeat or single stroke clutch the cut-out valve D and the vent valve E can be dispensed with and a direct hose connection may be provided between the right hand operating valve B² and the cylinder 17. Alternatively, the same end may be accomplished by merely closing the vent in the valve E. When the safety device is to be used with a repeat type clutch the vent in the valve E is opened to allow for venting of the cylinder.

*Operation.*—With a safety device as illustrated and hereinbefore described, when used with a non-repeat type clutch, the procedure and operation are as follows:

The right hand operating valve B¹ must be pressed down slightly in advance of the left hand operating valve B or simultaneously therewith. When this is done the compressed air from the source passes through the pneumatic circuit into the cylinder 17 and forces the piston downwardly, which action trips the clutch and operates the press. When the operating valves B and B² are opened in the manner specified, a puff or blast of air passes through the pneumatic circuit to act upon the piston, and after so acting, the incoming air pressure operates to move the plunger valve 47 of the cut-out valve C against the seat 54, and said valve will remain seated so long as the left hand operating valve V is held open. When the hand is removed from the left hand operating valve B the check valve 25 therein will seat under the force of the spring 26, the compressed air entrapped in the cut-out valve C will vent through the opening 40 in the valve B and permit the plunger valve 47 to unseat. When the hand is removed from the right hand operating valve B², the air from the cylinder 17 will vent through the opening 40 in said valve. As the air is released from the cylinder 17 the clutch trip 14 is returned to its operating position and the press can not again operate until the clutch is again tripped.

If either of the manually operable valves B or B² is tied down or held down, the cut-out valve C functions to prevent the piston in the cylinder from operating the clutch, because, as above described, if the left hand valve B is held down, the plunger valve 47 will remain seated and prevent the passage of air through the pneumatic circuit to the cylinder, while if the right hand operating valve B² is held down, the press will operate once; and once only as the check valve 60 of cut-out valve C holds the air in the piston and will not let it return. Furthermore as the effective area of the valve 60 acted upon by the trapped back pressure in cylinder 17 is greater than the effective area of the seating face of said valve, it will be apparent that the incoming air through the cut-out valve C upon unseating of valve B will be insufficient to unseat the valve 60.

Where the safety device is used with a repeating type clutch, the action is substantially the same as with the non-repeat clutch above described, except that the air from the cylinder is vented through the relief valve E, and this takes place before a second press operation. In this connection if either of the valves B or B² are tied down or held down, the press would not again trip because if the left hand valve B is held down the valve 52 of the cut-out valve C will remain closed and prevent the admission of air to the cylinder 17, while if the right hand valve B² is held down, the valve plunger 52a in the cut-out valve D will be held closed, since the compressed air entrapped between the check 60 in the cut-out valve C and the valve 52a of the cut-out valve D will operate to hold said valve 62a upon its seat.

It will thus be seen that the safety device is effective to prevent press operation if any attempt is made by the press operator to have one of his hands free during the tripping of the press.

The safety device, it will be understood, is subject to modification in constructional features and to various uses within the range of engineering skill, without departing from the spirit of the invention.

What I claim is:

1. Pneumatic safety control means for operation of a press or the like comprising a fluid pressure responsive member and a pneumatic circuit having therein means adapted to permit the passage of only a surge of compressed air from a source to said fluid responsive member, said last mentioned means comprising at least three valves in series, two of which are manually unseatable and the third is a cut-out valve, each of the manually unseatable valves comprising a casing having therein a valve seat, a spring-seated check valve, an inlet and an outlet on opposite sides of the valve seat and a vent opening, means adapted to establish communication between the outlet and the atmosphere when the check valve is seated and shut off such communication when the check valve is unseated, the inlet of the first of said two manually unseatable valves being connected to the fluid supply and its outlet being connected to the inlet of the cut-out valve, the second of the manually unseatable valves having its inlet connected to the outlet of the cut-out valve and its outlet connected to the fluid pressure responsive member, and the cut-out valve comprising a casing having an inlet, an outlet and a spring-loaded normally unseated check valve therebetween adapted to permit only a surge of compressed air to pass through the casing and then seat to cut off said flow, such surge of compressed air through the pneumatic circuit from the source to the pressure responsive member being possible only when the manually unseatable valve connected to the outlet of the cut-out valve is unseated in advance of, or simultaneously with, the other manually unseatable valve.

2. Pneumatic safety control means according to claim 1, wherein the spring-loaded check valve of the cut-out valve after closing will remain closed so long as the first of the two manually unseatable valves remains open.

3. Pneumatic safety control means according to claim 1 wherein the cut-out valve also has a floating check valve therein, between the spring-loaded normally unseated check valve and the outlet, which is adapted to open under incoming air pressure and close by the back pressure from the fluid pressure responsive member if the second of the two manually unseatable valves is held open after operation of the press.

4. Pneumatic safety control means for operation of a press or the like comprising a fluid pressure responsive member and a pneumatic circuit having therein means adapted to permit the passage of only a surge of compressed air from a source to reach said fluid responsive member, said means comprising five valves in series, two of which are disposed to be separately manually unseatable, two are automatically operable cut-out valves, and the fifth is a relief valve, each of the manually unseatable valves comprising a casing having therein a valve seat, a spring-seated check valve, an inlet and an outlet on opposite sides of the valve seat, and a vent opening, means adapted to establish communication between the outlet and the atmosphere when the check valve is seated, and shut off such communication when the check valve is unseated, the inlet of the first of said two manually unseatable valves being connected to the fluid supply and its outlet being connected to the inlet of the first cut-out valve, the second of the manually unseatable valves having its inlet connected to the outlet of the first cut-out valve and its outlet connected to the inlet of the second cut-out valve, and the outlet of the second cut-out valve being connected to the fluid pressure responsive member, each of said cut-out valves comprising a casing having an inlet, an outlet, and a spring-loaded normally unseated check valve therebetween adapted to permit only a surge of compressed air to pass through the casing and then seat to cut off said flow, such surge of compressed air through the pneumatic circuit from the source being possible only when the manually unseatable valve connected to the outlet of the first cut-out valve is unseated in advance of, or simultaneously with, the other manually unseatable valve, and the relief valve is disposed adjacent the fluid pressure responsive member and adapted to vent the compressed air therefrom after operation of the press.

SELDEN T. WILLIAMS.